5 Sheets—Sheet 3.
M. BRAY.
Machine for Riveting Mail-Bags.
No. 222,568. Patented Dec. 16, 1879.
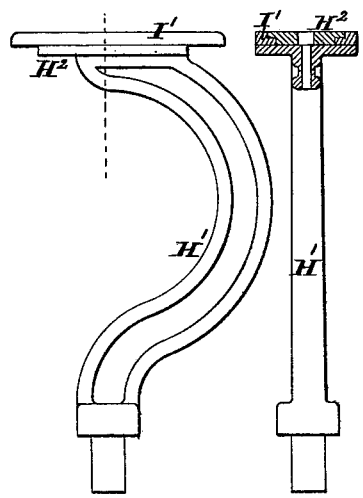
Fig.12. Fig.13.
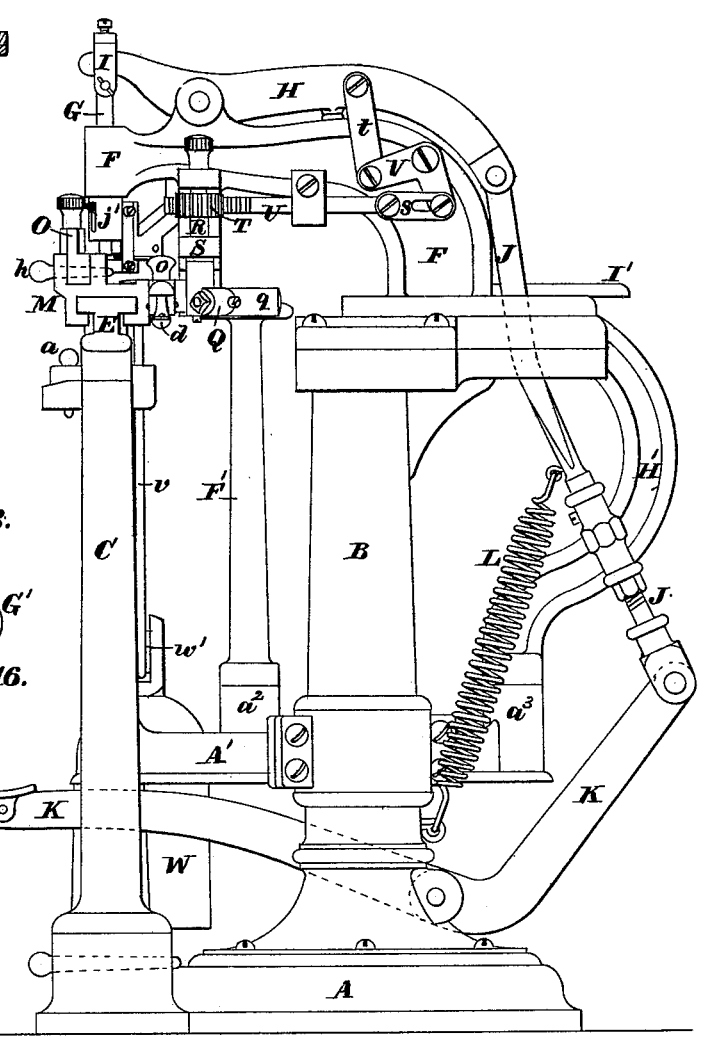
Fig.3.
Fig.16.
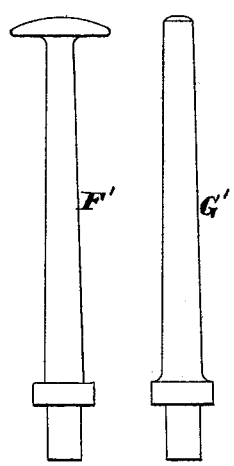 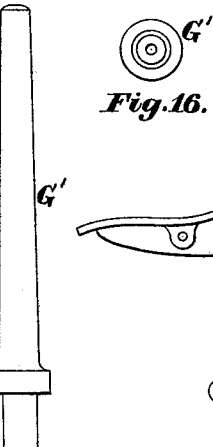
Fig.14. Fig.15.
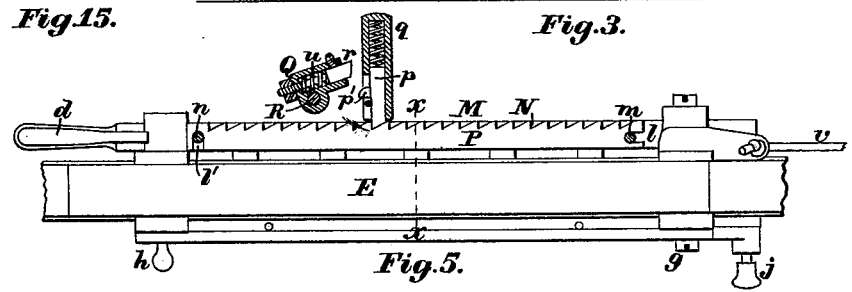
Fig.5.
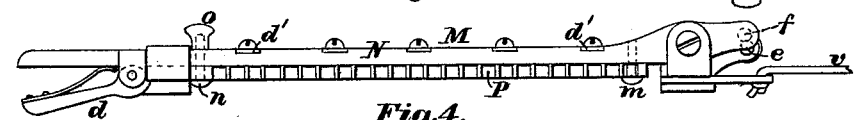
Fig.4.
Witnesses:
E. A. Hemmenway
C. H. Dodd
Inventor:
Mellen Bray
by N. C. Lombard, Attorney.

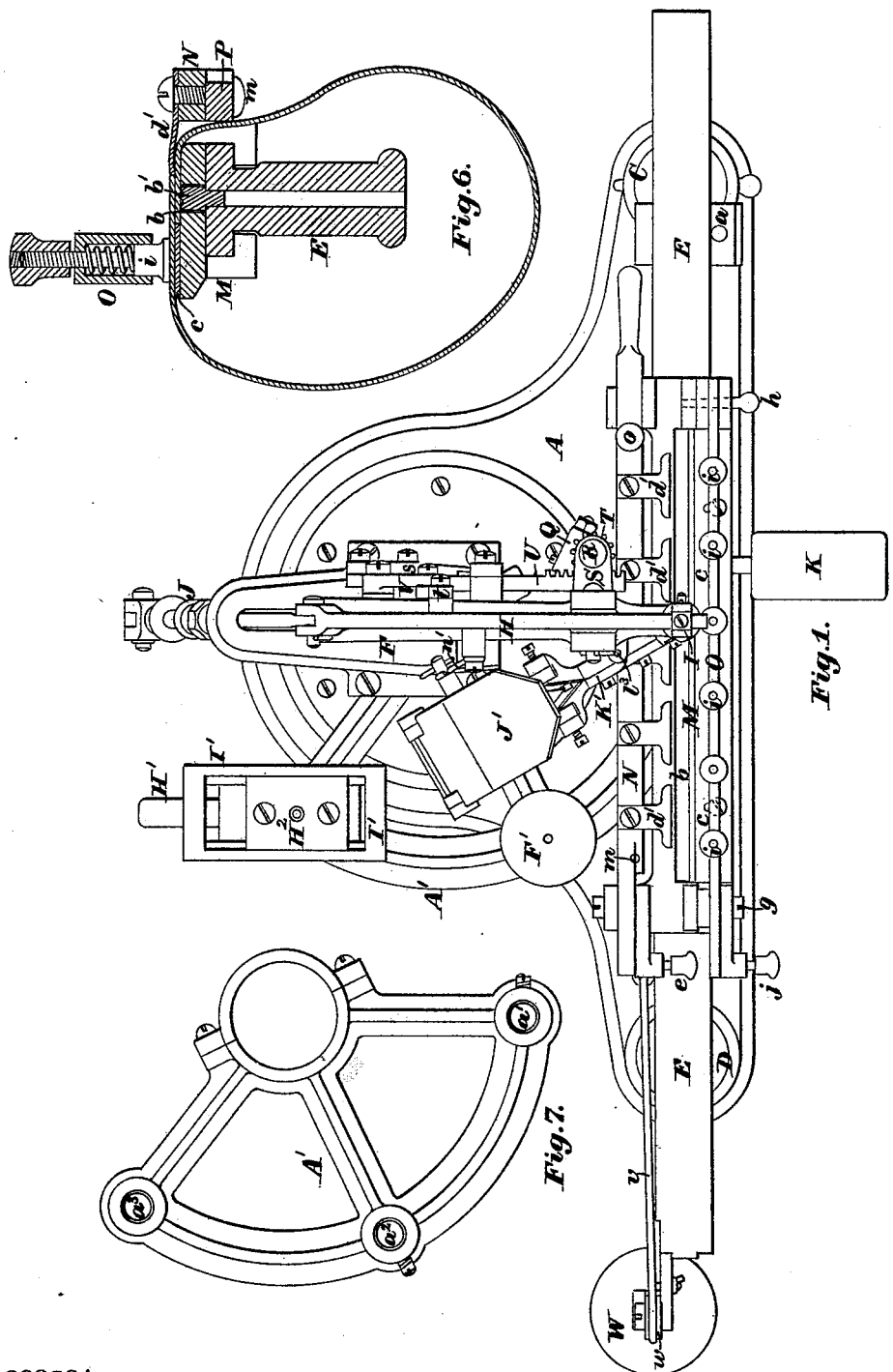

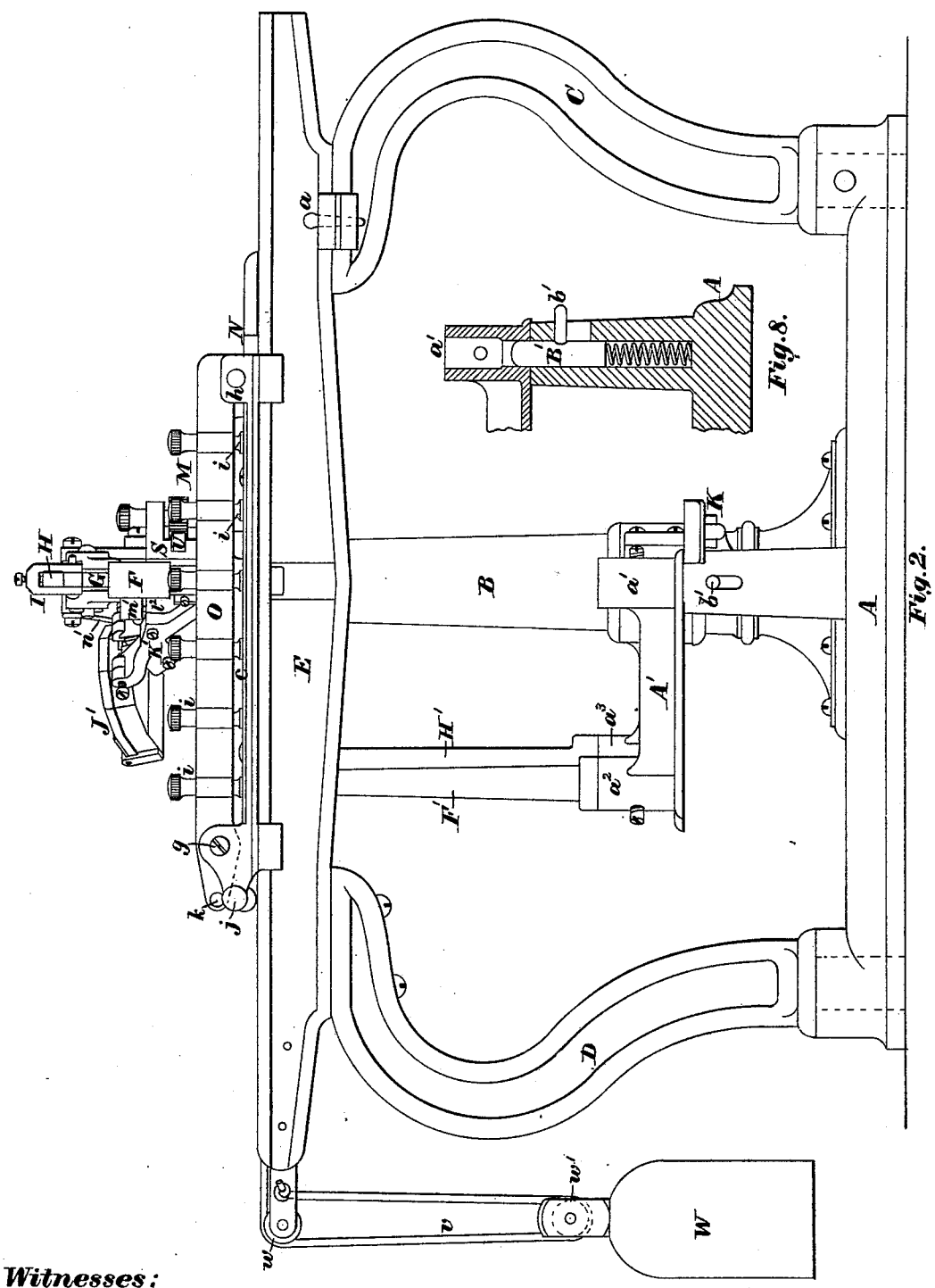

5 Sheets—Sheet 4.

M. BRAY.
Machine for Riveting Mail-Bags.

No. 222,568. Patented Dec. 16, 1879.

Witnesses:
E. A. Hemmenway
C. H. Dodd

Inventor:
Mellen Bray
by N. C. Lombard
Attorney.

N. PETERS, PHOTO-LITHOGRAPHER, WASHINGTON, D. C.

M. BRAY.
Machine for Riveting Mail-Bags.
No. 222,568. Patented Dec. 16, 1879.

Witnesses:
E. A. Hemmenway.
C. H. Dodd.

Inventor:
Mellen Bray
by N. C. Lombard
Attorney.

UNITED STATES PATENT OFFICE.

MELLEN BRAY, OF NEWTON, MASSACHUSETTS.

IMPROVEMENT IN MACHINES FOR RIVETING MAIL-BAGS.

Specification forming part of Letters Patent No. 222,568, dated December 16, 1879; application filed June 16, 1879.

*To all whom it may concern:*

Be it known that I, MELLEN BRAY, of Newton, in the county of Middlesex and State of Massachusetts, have invented certain new and useful Improvements in Machines for Riveting Mail-Bags and other Articles, of which the following, taken in connection with the accompanying drawings, is a specification.

My present invention relates to a machine to be used in the manufacture and repairing of mail-bags, certain portions of which machine are equally well adapted to be used in the manufacture of other articles; and it consists in a novel construction, arrangement, and combination of devices for holding the leather in position, feeding it under the setting devices, and separating and feeding the tubular rivets successively beneath the setting-plunger, which will be best understood by reference to the description of the drawings and the claims hereinafter given.

Figure 11:
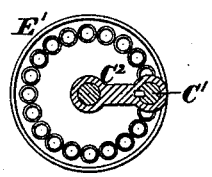
Figure 10:
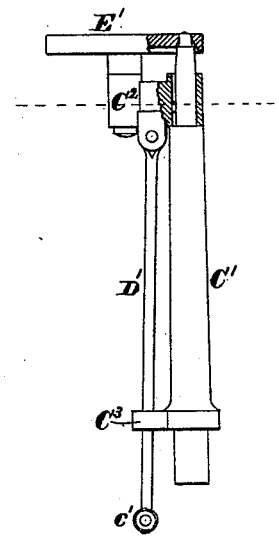
Figure 9:
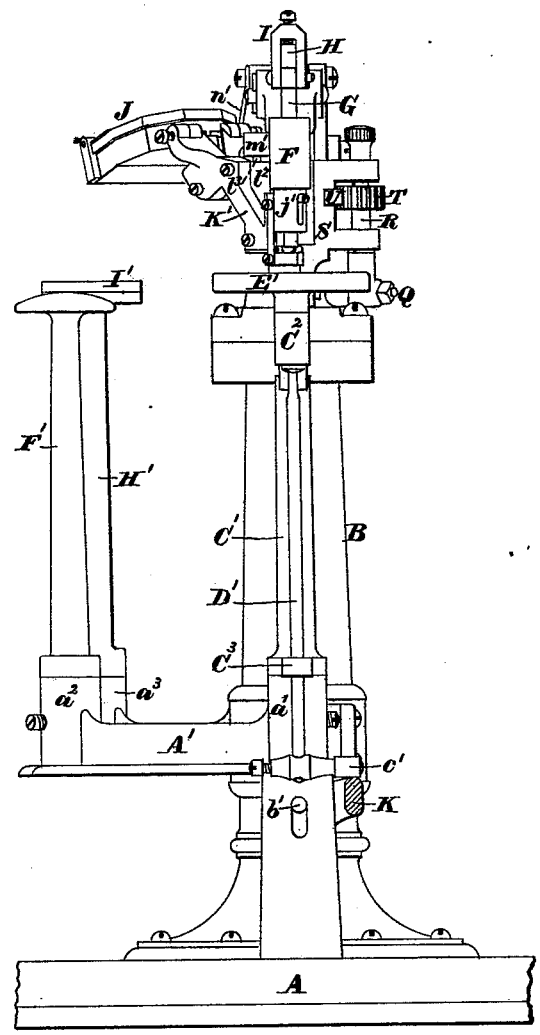
Figure 18:
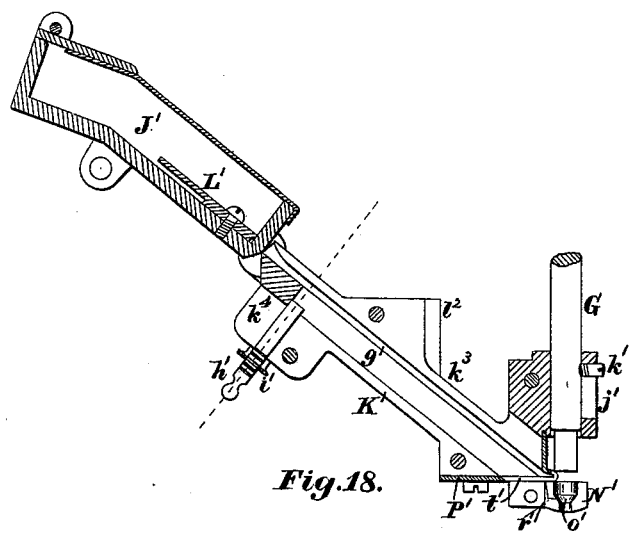
Figure 17:
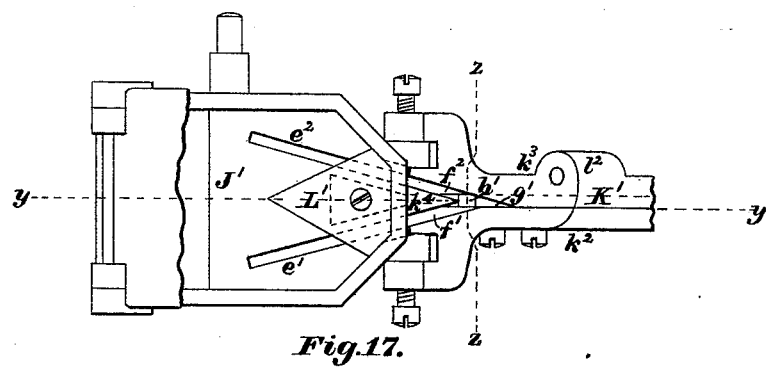
Figure 21:
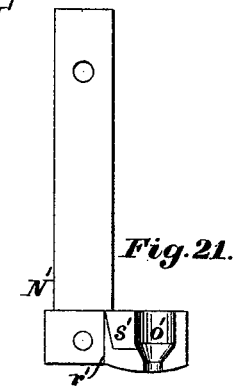
Figure 19:
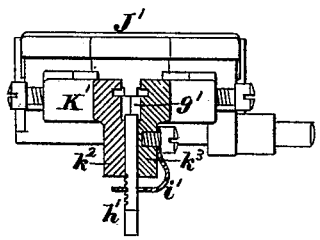
Figure 23:
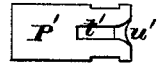
Figure 20:
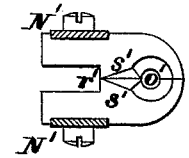
Figure 22:

Figure 1 of the drawings is a plan of a machine embodying my invention. Fig. 2 is a front elevation. Fig. 3 is an end elevation. Fig. 4 is an elevation of the inner clamping-bar and attached feed-rack, looking toward the front of the machine. Fig. 5 is an inverted plan of the feed-rack, the operating-pawls, and a portion of the anvil-supporting beam. Fig. 6 is a transverse section through line $x\ x$ on Fig. 5. Fig. 7 is a plan of the oscillating quadrant which carries the several anvil-supports to be used in riveting in the bottoms and patching or repairing bags. Fig. 8 is a vertical section through a portion of the quadrant and the support therefor, showing the devices for securing said quadrant in the desired position. Fig. 9 is a front elevation of the machine adapted to rivet in the bottoms of the bags, with the long beam and its supporting-standards broken away. Fig. 10 is a sectional elevation of the anvil-support to be used in securing the bottoms of the bags to the tubular portion. Fig. 11 is a horizontal section of same, looking upward. Figs. 12 and 13 are, respectively, a side elevation and a partial vertical section of one of the anvil-supports to be used in repairing bags. Fig. 14 is an elevation of an anvil-support of different form. Figs. 15 and 16 are, respectively, an elevation and a plan of an anvil-support of still another form. Fig. 17 is a plan of the hopper and a portion of the inclined chute extended in a horizontal position, with a portion of the hopper-cover broken away. Fig. 18 is a vertical section of the hopper and chute on line $y\ y$ on Fig. 17. Fig. 19 is a transverse section of the chute on line $z\ z$ on Fig. 17, looking toward the hopper. Fig. 20 is a plan of the spring rivet holding and registering jaws. Fig. 21 is an elevation of the inner side of one of said jaws; and Figs. 22 and 23 are, respectively, a side elevation and an inverted plan of the rivet supporting and guiding plate secured to the foot of the inclined chute.

A is the base or bed of the machine, having secured thereon in a fixed position the column B and the curved standard C; and D is another curved standard, set in a socket in the bed A, and adapted to be partially rotated therein, and having secured to its upper end one end of the beam E, the other end of which, when in use, rests upon the upper end of the standard C, to which it is secured by the pin $a$.

To the upper end of the column B is secured the goose-neck or machine-head F, carrying in its front end the reciprocating spindle G, to which motion is imparted by the lever H, links I and J, treadle-lever K, and spring L, all constructed, arranged, and adapted to operate in a well-known manner.

M is a carriage, made of a length somewhat greater than the length of the longest bag to be made thereon, and fitted and adapted to slide upon the upper ribs of the beam E, which, together with the upper surface of said beam, are planed to form a suitable bearing-surface therefor, said carriage being provided with a long slot, $b$, cut through the bar connecting its two bearing ends, to permit the upper surface of the anvil $b'$ to reach the under surface of the leather placed around said carriage and beam, as shown in Fig. 6, and allow a free endwise movement of said carriage for a distance equal to the length of the longest bag. That portion of the carriage M which is in front of the slot $b$ has secured upon its upper surface, so as to be adjustable toward or from said slot, the thin plate $c$, made of about the same thickness as the leather from which the bag is to be made, and adapted to serve as a gage, against which the edge of the leather is placed in securing the first end to the carriage.

N is a clamp-lever, pivoted at one end to the carriage M, and locked thereto at its other end by means of the spring-actuated latch-lever $d$, and having secured upon its upper side a series of spring plates or fingers, $d'$, which rest upon and hold the first end of the piece of leather, when placed in position beneath them, with its edge against the rear edge of the plate $c$.

The lever N may be raised when the beam E is swung from under the setting-tools, and held in an elevated inclined position by the spring-pin $e$, which engages with the hole $f$ in the end of the short arm of said lever.

O is another clamp-lever, pivoted at $g$ to the carriage M, and secured thereto at its other end by the pin $h$, and provided with a series of spring-actuated clamping-bolts, $i$ $i$, which rest upon and hold in position the other end of the piece of leather when wrapped around the carriage and beam with its edge bearing against the spring-plates $d'$, which serve the purpose of gages to determine the position of the edge of the piece of leather and the amount of lap thereof.

The movable end of the lever O may also be raised up by removing the pin $h$ till the spring-actuated pin $j$ engages with the hole $k$, formed in the short arm of said lever, as shown.

P is a feed-rack having a series of teeth formed in its edge, at distances from each other corresponding to the distances apart which it is desired to set the rivets in the bag— as, for instance, if it is desired to rivet the side seam in the bag with the rivets equidistant from each other, the teeth on the rack P will be equidistant from each other, as shown; but if it is desired to set two rivets one inch apart and a third one two inches from the second, the rack-teeth should be made just those distances apart.

In order to adapt the machine to a variety of work, a series of these racks are provided having their teeth arranged according to the several requirements of the several different kinds of work; and in order to facilitate the changing of said racks, a slot, $l$, is formed in one end thereof parallel with the edges of said rack, forming a fork which engages with the headed stud $m$, set in the under side of the lever N, and at the other end of said racks is formed another slot, $l'$, cut into the edge of said rack transversely of the length of the rack, which slot engages with the headed bolt $n$, set in the lever N, and provided with a thumb-nut, $o$, by means of which said rack is firmly secured to the lever N.

The carriage M is held in the desired position on the beam E by the spring-actuated pawl or dog $p$, which engages with the teeth of the rack P, as shown in Fig. 5, said dog having a bearing in a stand, $q$, attached to the goose-neck or head F, and is provided with a laterally-projecting lug, $p'$, as shown.

At each upward movement of the treadle, after a rivet has been set, the dog $p$ is disengaged from the rack P by the toe of the pawl $r$, which engages with the lug $p'$, and forces said dog backward against the tension of the spring which forces it forward.

The pawl $r$ is mounted in the hub Q, secured upon the lower end of the shaft R, mounted in bearings in the stand S, bolted to the gooseneck F, as shown in Figs. 1, 2, and 3.

The shaft R has secured thereon a spur-gear wheel, T, which meshes into and is oscillated about its axis by the rack U, which is mounted in a horizontal position in bearings on the side of the goose-neck F, and is made to reciprocate therein and partially rotate the shaft R by means of the links $s$ and $t$ and levers H and V.

When the rack U moves toward the front of the machine the shaft is partially rotated about its axis, carrying the pawl $r$ past the lug $p'$ toward the rack P, said pawl receding into its carrying-hub as it passes said lug, and compressing the spring $u$, which reacts and forces said pawl outward again as soon as it has passed said lug; and when the rack U is moved in the reverse direction by the upward movement of the treadle the point of the pawl $r$ engages with the lug $p'$ on the dog $p$, and moves said dog back and disengages it from the teeth of the rack P, thereby permitting the carriage M to move to the left till the next tooth in the rack P engages with the dog $p$, which is instantly forced into position to engage therewith as soon as the pawl $r$ is freed from the lug $p'$ by its oscillation about its axis of motion.

The carriage M is moved to the left when it is released from the dog $p$ by the action of the weight W, suspended by the cord $v$, attached at one end to the carriage M, and, passing over the pulley $w$, mounted on the beam E, and around the sheave $w'$, attached to the weight W, has its other end made fast to the beam E in an obvious manner.

A' is a quadrant-shaped stand fitted to a journal formed for the purpose upon the column B, about which it may be partially rotated at the will of the operator, and provided with sockets $a'$, $a^2$, and $a^3$, to receive anvil-supporting standards of different forms, to be hereinafter described.

When it is desired to apply the bottom or a patch to a bag, the beam E, carrying the carriage M, is swung to one side, and the quadrant A' is placed in the proper position to bring the desired standard into position under the setting-plunger, where it is locked by the spring-actuated bolt B', which may be withdrawn to permit the quadrant to be moved around the collar to bring a different standard into position by pressing downward upon the pin $b'$.

C' is a standard, to be secured in the socket $a'$, and carrying at its upper end the cross-head $C^2$, fitted thereto in such a manner that while it is free to be moved up and down thereon, it cannot be revolved about said standard, said cross-head having pivoted thereto the rod D', which extends downward therefrom through a bearing in the ear C³, and has secured thereon below said ear an arm, which projects laterally therefrom and carries an anti-friction roll, c', against which the treadle-lever K strikes at each upward movement thereof to lift the cross-head C², for a purpose which will presently appear.

E' is a disk having a diameter corresponding to the inner diameter of the bag, and mounted upon a stud in the upper side of the cross-head C², eccentric to the standard C', and having formed therein a series of holes, through which the anvil set in the standard C' projects as said holes are brought successively over the standard C', said disk, with the bag thereon, being moved around its axis from one hole to another when the cross-head and disk are raised up by the treadle-lever K striking the roll c', as before described; and when the treadle-lever is again depressed the disk E' descends till the upper surface thereof is level with the upper surface of the anvil, when the rivet is set by the descent of the setting-plunger G.

F' is an anvil-supporting standard set in the quadrant A', to be used in applying patches to the bottom of the bag by moving said quadrant to bring the standard into the proper relation to the setting-plunger; and G' is another anvil-support, to be used in cases where it is desirable to work close into a corner.

If it is desired to apply a patch to the side of a bag, the curved standard H' is brought into position under the setting-plunger, and the bag is drawn over the table H² and frame I', fitted to slide upon the table H² in a horizontal plane, by moving which, with the bag drawn over it, rivets may be inserted in any desired positions to secure the patch to the bag without danger of disturbing the position of the patch on the bag.

J' is a hopper pivoted to the upper end of the raceway or inclined chute K' in a well-known manner, and provided with a cover pivoted thereto at its rear end, also in a well-known manner.

The bottom of the hopper has formed therein two slots, e' and e², arranged obliquely to each other and to the sides of the hopper, through which the shanks of the rivets placed therein drop, so that they hang by their heads as they slide toward the front end of the hopper when its rear end is raised up, the front end of the hopper having two openings cut therein for the passage of said rivets to the inclined chute K', in the upper portion of which are formed two grooves or channels, f' and f², which converge toward each other and unite to form a single channel, g', as shown in Figs. 17, 18, and 19, the channels f' and f² forming continuations of the slots e' and e², from which the rivets slide freely in two paths from the hopper into the single channel g', hanging by their heads.

Heretofore great trouble has been experienced in feeding rivets, eyelets, and other like articles from two or more converging channels into a single channel, on account of the liability of their falling over at the junction of the converging channels with the single channel, and clogging or choking the channel.

To obviate this difficulty, an adjustable plunger, h', is set in the chute K', directly beneath point of junction of the channels f' and f², with the channel g' in position for the lower end of the shank of the rivet, eyelet, or other article to rest upon and be supported thereby when the support for the head is lacking, thereby preventing the rivet or eyelet from falling over into the wider space formed by the junction of two converging channels, as shown. The plunger h' has formed upon one side thereof a series of teeth or notches at a distance from each other just equal to the difference in the lengths of the shanks of the rivets, with which notches a spring-latch, i', engages to hold said plunger in the desired position, as shown in Fig. 19.

L' is a V-shaped plate secured to the bottom of the hopper above the slots e' and e², with its point toward the rear of the hopper, and its oblique edges crossing the slots, as shown, with sufficient space between its under side and the upper surface of the hopper-bottom for the free passage of the rivet-heads, the office of said plate being to prevent rivets which have not fallen into the slots from falling crosswise or head downward into the lower ends of said slots when the rear end of the hopper is raised, and interfering with the free passage of those rivets which are in the slots to the chute.

The chute K' is provided with a hub, j', at its lower end, bored out to fit the setting-plunger G, which moves freely through it during a portion of its stroke, while the two move together during another portion of the stroke of said plunger; a pin, k', set in said plunger, through a slot in the hub j', determining the length of movement of the plunger through the hub.

The chute K' is also provided with a boss, l², in which is formed a vertical hole to fit a pin, l³, set in the ear m' on the side of the goose-neck, which serves to maintain the chute and hopper at the desired angle to the goose-neck, and to guide the chute in its short vertical reciprocation.

The hopper J' is connected by the link n' to the lever H in such a manner that the vibrations of said lever about its axis of motion cause the hopper to be moved up and down about its pivotal connection to the chute K'.

For convenience in construction the chute K' is made in three pieces, the two main pieces k² and k³ extending the whole length of the chute, and each forming one wall of the channel g' and the outer wall of the channel f' or f², the third piece, k⁴, having formed upon its upper end the V-shaped piece which forms the inner walls of the channels $f'$ and $f^2$, as shown in Fig. 17.

N' N' are a pair of spring-jaws, attached by their upper ends to the hub $j'$, one upon either side, and are so formed as to meet at their lower ends beneath said hub, and have formed in said thickened portions a pocket, $o'$, one-half in each jaw, the upper portion of which has a diameter slightly greater than the diameter of the rivet-head and the lower portion of a diameter corresponding to or slightly in excess of the diameter of the shank of the rivet, with a conical portion connecting the larger and smaller portions, said pocket being so arranged as to be directly beneath and in line with the setting-plunger G.

The rear portion of the thickened lower end of the jaws N' N' are cut away so that their sides shall form, when said jaws are closed, continuations or extensions of the side walls of the channel $g'$, which serve to guide the shank of the rivet till the forward one in the line bears against the shoulders $r'$, formed by said cut-away.

Between the pocket $o'$ and the shoulder $r'$ in each jaw is formed an inclined surface, $s'$, which serves the purpose of forcing the lower rivet into the pocket $o'$ and insuring its proper registration in line with the setting-plunger, which is accomplished in the following manner: When the plunger G is moved downward to set a rivet, its lower end, or the head of the rivet beneath it, acting upon the conical surface in the pocket $o'$, causes the jaws N' N' to open sufficiently to permit the front rivet in the line descending the chute, and which rested against the shoulders $r'$, to be pressed forward beyond the shoulders $r'$ into contact with the plunger G and between the inclined surfaces $s'$ $s'$ by the weight of the column of rivets behind it, and when the plunger is moved upward again the jaws N' N' move toward each other, and the inclined surfaces $s'$ $s'$, striking the front rivet, force it forward into the pocket $o'$, and the shoulders $r'$ hold back all the other rivets in the line till the operation is repeated.

A thin metal plate, P', bent to the form shown in Fig. 22, is secured to the lower end of the chute K', and has cut through its front lower portion the slot $t'$, to receive the shank of the rivet, and widened at the bend $u'$, to permit the passage of the rivet-head.

What I claim as new, and desire to secure by Letters Patent of the United States, is—

1. In a machine for riveting mail-bags, the combination of a pivoted beam for supporting the anvil and the bag to be riveted, a carriage adapted to be moved endwise upon said beam, mechanism for clamping the leather to the carriage in the form of a tube, a feed mechanism for feeding said carriage and the bag clamped thereon endwise along said beam, and mechanism for separating the rivets and setting them in said bag in succession, substantially as described.

2. In a machine for manufacturing mail-bags, the combination of the standard D, adapted to be partially rotated in its socket, and the beam E, firmly attached at one end to the upper end of the standard D, and adapted to be vibrated in a horizontal plane about the axis of the standard D, and to rest at its other end upon a fixed support, substantially as described.

3. The carriage M, fitted to and adapted to be moved endwise upon the beam E, and provided with the slot $b$ for the passage of the anvil $b'$, in combination with mechanism for feeding said carriage endwise along said beam, substantially as and for the purposes described.

4. In combination with the carriage M, provided with the slot $b$, the lever N, pivoted as set forth, and provided with spring clamping-fingers $d'$, and the gage-plate $c$, all arranged and adapted to operate substantially as described, for the purposes specified.

5. The combination of the carriage M, lever N, provided with spring clamping and gaging fingers $d'$, gage-plate $c$, and the lever O, pivoted as set forth, and provided with spring-actuated clamping-bolts $i$ $i$, all arranged and adapted to operate substantially as and for the purposes described.

6. The toothed rack P, provided with the open slots $l$ and $l'$, formed in the opposite ends thereof and at right angles to each other, in combination with the fixed stud $m$, and clamping-bolt $n$ and nut $o$, substantially as described.

7. In combination with the beam E and carriage M, the toothed rack P, spring-actuated dog $p$, and tripping-pawl $r$, adapted to be oscillated about an axis, and to engage with and disengage the dog $p$ from said rack, substantially as and for the purposes described.

8. The combination of the carriage M, rack P, spring-actuated dog $p$, provided with the lug $p'$, spring-actuated pawl $r$, shaft R, gear-wheel T, toothed rack U, and means for imparting a reciprocating motion to said rack U by the vibration of the treadle-lever, substantially as described.

9. In combination with a rivet separating and driving mechanism, the quadrant A', fitted to and adapted to be partially rotated at will about a journal, two or more anvil-supports of different forms mounted in sockets in said quadrant, and each adapted to be brought into position beneath and in line with the setting-plunger, and a locking device adapted to secure the quadrant in the desired position, substantially as described.

10. In a machine for riveting mail-bags, the combination of the standard C', cross-head $C^2$, rod D', provided with a laterally-projecting stud or pin at its lower end, the treadle-lever K, and disk E', provided with a series of holes corresponding in number and distance apart to the rivets to be set in the bottom of the bag, substantially as and for the purposes described.

11. In a machine for riveting mail-bags, the standard H', provided with the table H², in combination with the frame I', fitted to and adapted to be moved horizontally upon said table, substantially as and for the purposes described.

12. The hopper J', provided with two slots, $e'$ and $e^2$, and two openings for the passage of the rivets therefrom, in combination with the inclined chute K', provided at its upper end with two channels, $f'$ and $f^2$, coinciding at their upper ends with the slots $e'$ and $e^2$ in the hopper, and converging toward each other and uniting in a single channel, $g'$, substantially as described.

13. In combination with the hopper J', provided with the two slots $e'$ and $e^2$ cut in its bottom, the V-shaped plate L, constructed, arranged, and adapted to operate substantially as and for the purposes described.

14. In combination with the chute K', provided with the channels $f'$, $f^2$, and $g'$, arranged relative to each other as set forth, the plunger $h'$, adapted to be adjusted to a position to serve as a support for the rivet in passing from the channels $f'$ and $f^2$ to the channel $g'$, substantially as described.

15. In combination with the chute K', provided with the channels $f'$, $f^2$, and $g'$, the plunger $h'$, provided with a series of teeth or serrations, and the spring-latch $i'$, adapted to engage with said teeth and hold the plunger in the desired position, substantially as described.

16. The chute K', made up of the three pieces $k^2$, $k^3$, and $k^4$, constructed, arranged, and secured together substantially as described.

17. A pair of spring jaws, N' N', each provided with a semicircular recess, $o'$, the shoulder $r'$, and inclined surface $s'$, in combination with an inclined chute, K', and setting-plunger G, all arranged and adapted to operate substantially as and for the purposes described.

18. The slotted plate P', bent to the form shown, and provided with the slot $t'$, secured to the foot of the chute K', substantially as shown and described, for the purposes specified.

Executed at Boston, Massachusetts, this 13th day of June, A. D. 1879.

MELLEN BRAY.

Witnesses:
  N. C. LOMBARD,
  E. A. HEMMENWAY.